United States Patent [19]

Saito

[11] Patent Number: 4,728,148
[45] Date of Patent: Mar. 1, 1988

[54] SUPPORTING STRUCTURE OF THE LUMBAR PORTION OF THE FOAM CUSHION MEMBER IN AN AUTOMOTIVE SEAT

[75] Inventor: Tetsuo Saito, Akishima, Japan
[73] Assignee: Tachi-S Co., Ltd., Tokyo, Japan
[21] Appl. No.: 939,476
[22] Filed: Dec. 8, 1986
[51] Int. Cl.⁴ ............................................. A47C 7/46
[52] U.S. Cl. .............................. 297/284; 297/DIG. 1; 5/464
[58] Field of Search ......... 297/284, 455, 460, DIG. 1, 297/452; 5/DIG. 2, 464, 446, 447

[56] References Cited

U.S. PATENT DOCUMENTS

| | | | |
|---|---|---|---|
| 2,192,601 | 3/1940 | Mattison | 5/464 |
| 2,320,425 | 6/1943 | Glaes et al. | 5/464 |
| 3,086,817 | 4/1963 | Wilfert | 297/284 |
| 3,321,241 | 5/1967 | Froelich | 297/284 |
| 3,326,601 | 6/1967 | Vanderbilt | 297/284 |
| 3,606,463 | 9/1971 | Brooks | 297/455 |
| 3,840,920 | 10/1974 | Voelker | 297/284 X |
| 4,190,697 | 2/1980 | Ahrens | 297/DIG. 1 |
| 4,522,447 | 6/1985 | Snyder | 297/452 |
| 4,555,137 | 11/1985 | Göldner | 297/284 |
| 4,571,763 | 2/1986 | Suzuyama | 297/DIG. 1 |

FOREIGN PATENT DOCUMENTS 1399343  4/1965  France ..................... 5/464

Primary Examiner—Peter A. Aschenbrenner
Attorney, Agent, or Firm—Oldham, Oldham, & Weber Co.

[57] ABSTRACT

A structure of a lumbar support portion of a seat back of an automotive seat is disclosed. In a cushion member formed of foam material or in the portion thereof corresponding to the lumbar support portion, there is provided a block member embedded when the cushion member is formed by a mold. The block member comprises an impreganted portion where a foam solution for forming the cushion member is impregnated when the cushion member is foamed and is hardened afterwards, and a soft non-impregnated portion where the cushion member forming foam solution is not impregnated. A body pressure distribution is obtained in which the pressure in the impregnated portion is the greatest and the remaining pressures existing upwardly and downwardly of the greatest pressure are gradually decreased as they recede from the impregnated portion, resulting in the improved tuning of the seat.

6 Claims, 11 Drawing Figures

SUPPORTING STRUCTURE OF THE LUMBAR PORTION OF THE FOAM CUSHION MEMBER IN AN AUTOMOTIVE SEAT

BACKGROUND OF THE INVENTION

1. Field of the Invention

The present invention relates to a structure of a lumbar support portion of a seat back of an automotive seat for supporting the lumbar vertebrae portion of an occupant of the automotive seat and, in particular, to a structure of a lumbar support portion of a seat back of an automotive seat which can distribute the body pressure of the occupant in a well-balanced manner.

2. Description of the Prior Art

Since the lumbar support portion of the seat back of the automotive seat must carry heavier loads given by the occupant when compared with the remaining portions of the seat back, conventionally, there have been devised various measures to cope with this problem. That is, in order to increase the supporting capability of the lumbar support portion (A), in the prior art, there have been enforced several methods: in a first method, the tensile forces of spring members (a)(b) which are provided over such lumbar support portion in a frame (4) shown in FIG. 1 are increased with respect to other spring members (c)(d)(e) provided over the remaining portions in the frame, (FIG. 2); in a second method, a projected portion (c) is provided on the front side (the lumbar vertebrae portion of the occupant) of a cushion member (1') formed of foam material, (FIG. 3); and, thirdly, a high density of foam block member (5) is embedded into the foam cushion member (1'), (FIG. 4).

However, there have been found some disadvantages in the above-mentioned methods. For example, in a structure constructed in accordance with the first method, that is constructed by increasing the tensine forces of the spring members (a)(b), as shown by a body pressure distribution diagram in FIG. 6, there is produced a steep difference (w) in body pressure responsive force between the lumbar support portion (A) and the remaining portions of the seat back. Also, in actual use, as shown in FIG. 7, if the occupant moves or rotates his or her upper body about a hip point (HP) by angle of θ, then the pressure of the spring member (b) is increased with respect to the spring member (a) correspondingly to the occupant's movements for the angle of θ, and thus the pressure of the spring member (b) becomes higher than a set peak line (F) (that is, an ideal design line in which a maximum loading force is applied to the lumbar vertebrae portion of the occupant in the most favorable direction thereof).

Accordingly, the conventional seat backs constructed in accordance with the above-mentioned methods cannot be tuned to its body pressure responsive force in a well-balanced manner, thus they fail to provide a comfortable sitting feeling.

In FIGS. 2 through 4, reference numeral (3) designates a trim cover assembly which forms a part of the automotive seat.

SUMMARY OF THE INVENTION

The present invention aims at eliminating the drawbacks found in the above-mentioned conventional structures of the seat backs of the automotive seats.

Accordingly, it is an object of the invention to provide an improved structure for a lumbar support portion of a seat back of an automotive seat which eliminates a possibility that there are caused steep differences in the body pressure responsive force of the cushion member at its lumbar support portion in relation to a set peak line of the force. the present invention comprises a foam cushion member, a block member integrally provided in a predetermined portion of the cushion member, and spring members attached at such predetermined portion, in such a manner that the block member is partially impregnated with the cushion member by impregnating a part of the block member with a foam solution and foaming the foam solution into a desired shape of the cushion member, so as to provide a structure that the impregnated portion of the block member is embedded in the portion of the cushion member corresponding to the spring member so that such impregnated portion of the block member is positioned at a set peak line of the body pressure responsive force of the cushion member at the lumbar portion thereof.

Accordingly, the impregnated portion of the block member is harder than the cushion member, and therefore, provides a maximum peak value in the above-mentioned body pressure responsive force of the cushion member. Due to this fact, the body pressure responsive force is distributed over the cushion member in a well-balanced manner relative to a body pressure of an occupant thereon, or a pressure of his or her lumbar portion, such that the body pressure responsive force gradually decreases from the impregnated portion of the block member towards the respective non-impregnated portions of the block, one of which is defined upwardly thereof and the other of which is defined downwardly thereof, down to the regions of the cushion member where the block member is not provided.

BRIEF DESCRIPTION OF THE DRAWINGS

Other objects and aspects of the invention will become apparent from the following description of embodiments with reference to the accompanying drawings in which.

DETAILED DESCRIPTION OF PREFERRED EMBODIMENTS OF THE INVENTION

Figure 1:
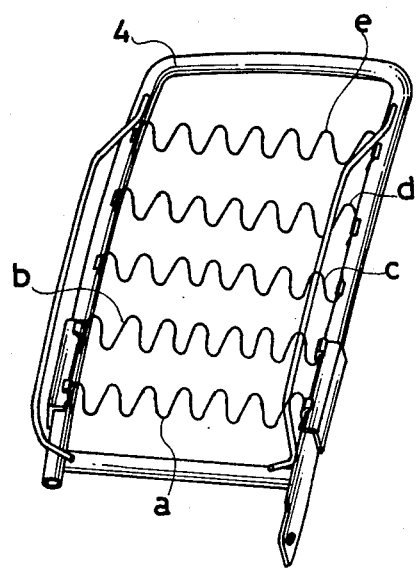
FIG. 1 is a perspective view of a frame of a seat to which the invention is applied.
Figure 5:
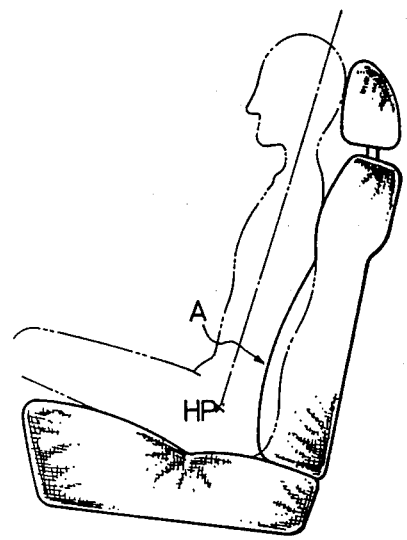
FIG. 5 is a side view of a seat to which the invention is applied.
Figure 3:
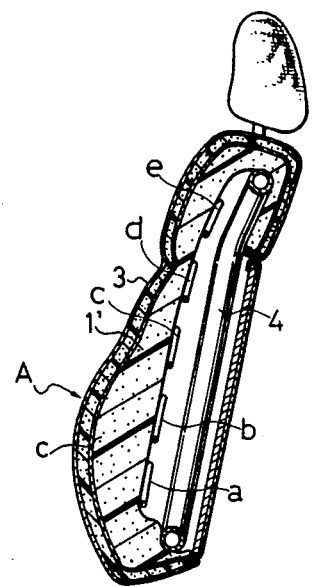
FIGS. 2 through 4 are respectively section views of conventional seat backs.
Figure 4:
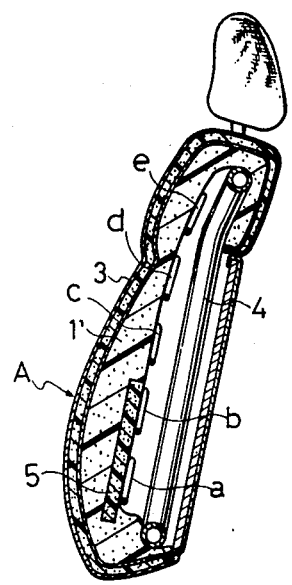
Figure 2:
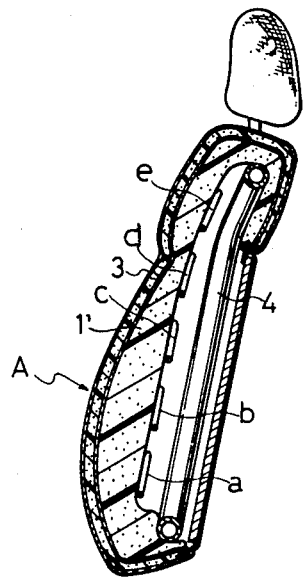
Figure 6:
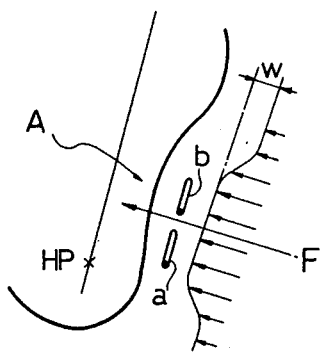
FIG. 6 is a view to show a body pressure responsive force distribution in a conventional seat back.
Figure 7:
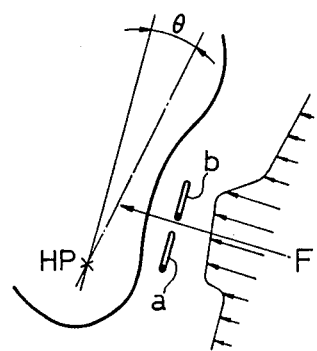
FIG. 7 is a view similar to FIG. 6, showing a variation of the above conventional seat back body pressure responsive force distribution which may occur when an occupant is actually seated and rotates his or her body about his or her hip point by an angle of θ.
Figure 8:
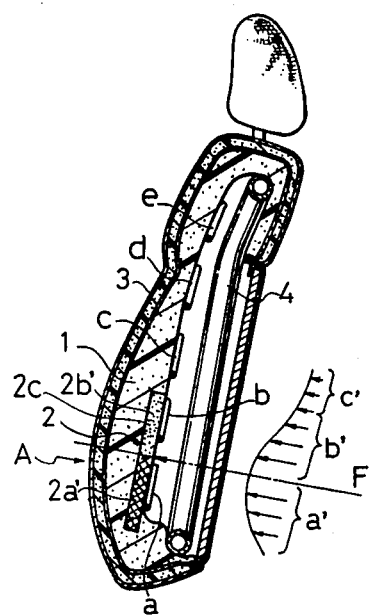
FIG. 8 is a longitudinal section view to show a first embodiment according to the invention and the body pressure responsive force distribution thereof.

Referring first to FIG. 8, there is shown a longitudinal section view of a first embodiment of the invention together with the pressure distribution view thereof. In the drawings, reference numeral (1) designates a cushion member which is formed in a predetermined shape by means of a mold and made of foam material (urethane foam or the like), and (2) represents a block member formed integrally with the cushion member. The block member (2) comprises an impregnated portion (2a') which is formed, as will be described in detail later, such that in the process of forming the cushion member (1), a portion of the block member (2) corresponding to the impregnated portion (2a') is impregnated with a solution of foamable material, a basic material for the cushion member (1), and then is subjected to foaming process of the cushion member (1), and further a non-impregnated portion (2b') which is not impregnated with the solution in such a cushion member forming process. In this embodiment, the impregnated portion (2a') constitutes a lower half of the block member (2). The impregnated portion (2a') and non-impregnated portion (2b') of the block member (2) are respectively abutted against and supported by spring members (a) and (b). The two spring members (a), (b), which form a lumbar support portion (A) of a shown seat back, have the same tensile forces and are respectively S-shaped springs larger in diameter than other remaining spring members (c), (d), (e), —. These spring members (a), (b), (c), are provided in order over an inverted U-shaped frame (4) such that each extends transversely of the frame (4).

Figure 9:
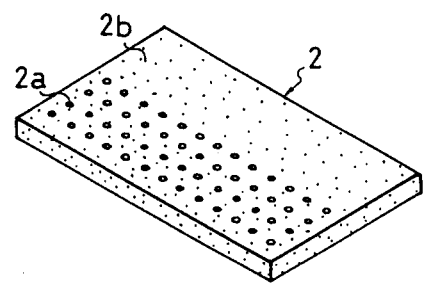
FIG. 9 is a perspective view of a block member employed in the above first embodiment of the invention.

The above-mentioned cushion member (1), which is mounted such that it extends from the front surfaces of these spring members (a), (b), (c), (d), (e) through the top portion of the frame (4) to the rear side of the frame (4), is formed by using a mold so as to have an outside shape similar to a prior art cushion member. In this forming, the block member (2) has been previously stored and fixed within the mold before the cushion member (1) and the block member (2) are foamed integrally with each other. The block member (2) is a foam chip member or a flat-plate-shaped slab member (formed of foam material) and, as shown in FIG. 9, it is formed in its lower half section with a large number of through bores (2a), (2a), —. Accordingly, during the foaming process of the cushion member (1), a foam solution that has been injected into the mold is impregnated into those through-bores (2a), (2a)—of block member (2), and then the foam solution is foamed, with its portion impregnated in the through-bores (2a), (2a)—being hardened, with the result that, there is produced the impregnated portion (2a') in the lower half section of the block member (2). The solution thus foamed will not penetrate into the remaining portion (2b) of the block member (2), that is, the upper half section thereof.

In the non-impregnated portion (2b'), the foamed solution cannot penetrate into the internal portion thereof, but the foamed solution can penetrate into the surface of the block member (2) that is embedded on the side of the cushion member (1), which can provide a hardened layer (2c). The foamed solution can penetrate into the surface of the block member (2) because the surface of block member (2) has a plurality of minute aperture or irregularities, into which the foamed solution penetrates and thus the solution is hardened within the thin layer portion of the surface of block member (2) and further hardened in its region adjacent to the surface of block member (2). As a result of this, the block member (2) is provided with the hardened surface layer (2c) harder than the cushion member (1) itself.

The above-mentioned through-bores (2a), (2a)—,—formed in the block member (2) may be all equal in both diameter and density and also may be spaced apart from one another at a given interval. However, it is preferred that, the through-bores (2a) become gradually smaller in diameter and density accordingly as they recede from the set peak line (F) of the lumbar support portion (A). In this preferred arrangement, since the amounts of the impregnated foam solution included in the through-bores (2a) are reduced according as the through-bores (2a) recede from the set peak line (F), the degree of hardness of the impregnated portion (2a') is gradually decreased, so that the pressure distribution in the preferred arrangement can be reduced gradually from the set peak line (F) in a gentle curved line.

Also, the above-mentioned non-impregnated portion (2b') is not limited to one that does not contain any foam solution therein as mentioned before, but it may be one that contains a smaller amount of the foam solution with respect to the impregnated portion (2a').

Now, the cushion member (1) with the block member (2) embedded therein is then covered by a trim cover assembly (3) to provide a seat back.

The illustrated trim cover assembly (3) is a laminated body which comprises a top cover member (cloth or the like), a wadding formed of foam material (slab material), and a wadding cover. Accordingly, the lumbar support portion (A) is composed of the trim cover assembly (3), cushion member (1), block member (2), and spring members (a), (b).

Thus, the lumbar support portion (A) with the block member (2) embedded therein can show such a body pressure responsive force distribution with the set peak line (F) as the center thereof as shown in FIG. 8. That is, according to this body pressure responsive force distribution view, in a portion (a') located downwardly of the set peak line (F), there are produced repelling forces by the impregnated portion (2a') and the spring member (a), since the impregnated portion (2a') of the block member (2) and the spring member (a) are present in the portion (a'). Also, in a portion (b') located upwardly of the set peak line (F), the body pressure responsive force thereof is lowered by the action of the non-impregnated portion (2b') of the block member (2) and the spring member (b). In addition, in a portion (c') located above the block member (2), there exists only the body pressure responsive force by the cushion member (2).

Therefore, the body pressure responsive force of the lumbar support portion (A) is gradually decreased upwardly and downwardly from the set peak line (F) in a gentle curved line, eliminating the possibility that such level difference (w) as in the above-mentioned prior art seat back may be produced.

Figure 10:
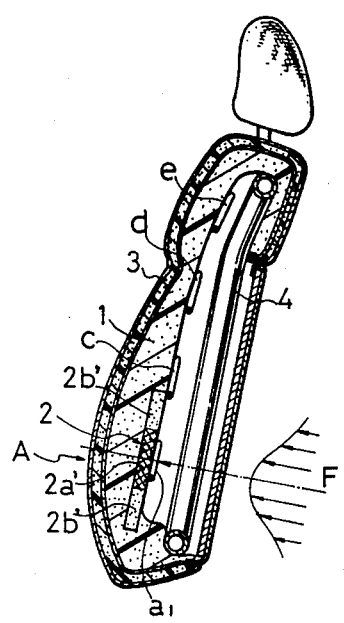
FIG. 10 is a longitudinal section view to show a second embodiment according the invention and the body pressure responsive force distribution thereof; and, FIG. 11 is a perspective view of a block member employed in the second embodiment of the invention.

Referring now to FIG. 10, there is shown another embodiment of the invention, in which the block member (2) comprises an impregnated portion (2a') located in the vertically central portion thereof and two non-impregnated portions (2b'), (2b') respectively disposed upwardly and downwardly of the central impregnated portion (2a'); the set peak line (F) is situated centrally of the impregnated portion (2a') of the block member (2a); and, there is provided a spring member ($a_1$) so as to correspond to the impregnated portion (2a') of the block member. Accordingly, in this embodiment, there is obtained such a body pressure responsive force distribution as shown in FIG. 10.

Figure 11:
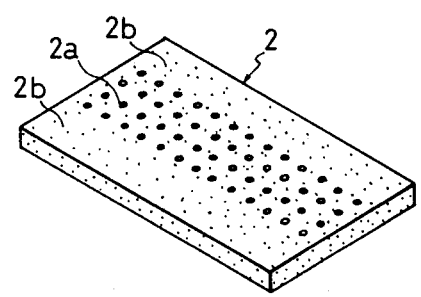

In FIG. 11, there is illustrated the block member (2) before it is embedded into the cushion member (2). In this figure, reference character (2a) designates through-bores, and (2b), (2b) respectively represent the portions of the block member in which the through-bores are not formed.

According to the second embodiment of the invention, the impregnated portion of the block member is harder than the cushion member and the non-impregnated portions of the block member and is thus higher in body pressure responsive force than them, that is, the block member impregnated portion provides the maximum value in a body pressure responsive force distribution. And, there can be expected a well-balanced body pressure responsive force distribution with respect to the body pressure responsive force in a range extending from the two non-impregnated portions respectively disposed upwardly and downwardly of the impregnated portion of the block body to the cushion member. As a result of this, it is possible to support the lumbar vertebrae portion of the occupant in the thus constructed lumbar support portion in an excellent manner to thereby provide a comfortable sitting feeling, which eliminates the disadvantages found in the above-mentioned conventional seat back.

What is claimed is:

1. A structure of the foam cushion member at the lumbar support portion of an automotive seat comprising a plurality of spring members extending across the right and left sides of a frame said spring members being arranged vertically thereon, and a foam cushion member connecting to said spring members, and further having a foam block member integrally provided in the lumbar support portion of said foam cushion member by means of partially impregnating said foam block member with a foam solution for forming a hard and a soft section therein, said impregnated portion of said foam block member corresponding to said spring member for positioning said foam block member at a set peak line of the body pressure responsive force of said foam cushion member.

2. A structure of the foam cushion member at the lumbar support portion of an automotive seat as set forth in claim 1, wherein said impregnated portion of said foam block member is harder with respect to said foam cushion member and said non-impregnated portion of said foam block member is softer with respect to said foam cushion member.

3. A structure of the foam cushion member at the lumber support portion of an automotive seat as set forth in claim 1, wherein said impregnated portion of said foam block member is located in said lumbar support portion to which the maximum body pressure responsive force exists.

4. A structure of the foam cushion member at the lumbar support portion of an automotive seat as set forth in claim 1, wherein said said block member further comprises a first impregnated portion in which a large amount of the foam solution is impregnated and a second impregnated portion in which a less amount of the foam solution is impregnated, respectively, per unit area of the block member.

5. A structure of the foam cushion member at the lumbar support portion of an automotive seat as set forth in claim 1, wherein said foam block member is a flat-plate-shaped slab member formed of foam material, and having a plurality of through-bores for allowing said cushion member forming foam solution to penetrate therein.

6. A structure of the foam cushion member at the lumbar support portion of an automotive seat as set forth in claim 1, wherein said non-impregnated portion of said foam block member is formed with a hardened layer on the surface thereof facing said foam cushion member, and said hardened layer is harder than said foam cushion member.

* * * * *